United States Patent
Derocher et al.

(10) Patent No.: US 10,858,032 B2
(45) Date of Patent: Dec. 8, 2020

(54) CLAMP LOAD ADJUSTMENT ASSEMBLY FOR STEERING COLUMN

(71) Applicant: Steering Solutions IP Holding Corporation, Saginaw, MI (US)

(72) Inventors: Robert C. Derocher, Essexville, MI (US); Leslie E. Edmundson, Clio, MI (US); Jeremy M. Zemla, Owosso, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 197 days.

(21) Appl. No.: 16/204,746

(22) Filed: Nov. 29, 2018

(65) Prior Publication Data

US 2020/0172144 A1    Jun. 4, 2020

(51) Int. Cl.
*B62D 1/181* (2006.01)
*B62D 1/187* (2006.01)
*B62D 1/184* (2006.01)
*B62D 1/183* (2006.01)

(52) U.S. Cl.
CPC ............. *B62D 1/181* (2013.01); *B62D 1/183* (2013.01); *B62D 1/184* (2013.01); *B62D 1/187* (2013.01)

(58) Field of Classification Search
CPC ........ B62D 1/181; B62D 1/187; B62D 1/184; B62D 1/183
See application file for complete search history.

(56) References Cited

U.S. PATENT DOCUMENTS

| | | | | |
|---|---|---|---|---|
| 6,131,481 A | * | 10/2000 | Wilson | B62D 1/184 74/492 |
| 7,267,025 B2 | * | 9/2007 | Ko | B62D 1/184 74/493 |
| 9,758,188 B1 | * | 9/2017 | Buzzard | B62D 1/184 |
| 2002/0083784 A1 | * | 7/2002 | Brauer | B62D 1/184 74/57 |
| 2005/0167962 A1 | * | 8/2005 | Sato | B62D 1/187 280/775 |
| 2005/0178231 A1 | * | 8/2005 | Schick | B62D 1/184 74/493 |
| 2006/0144183 A1 | * | 7/2006 | Korzan | B62D 1/184 74/492 |
| 2013/0263686 A1 | * | 10/2013 | Osawa | B62D 1/184 74/495 |
| 2017/0015346 A1 | * | 1/2017 | Johta | B62D 1/192 |
| 2017/0057536 A1 | * | 3/2017 | Vermeersch | B62D 1/184 |
| 2017/0355393 A1 | * | 12/2017 | Okada | B62D 1/184 |

(Continued)

*Primary Examiner* — Darlene P Condra
(74) *Attorney, Agent, or Firm* — Dickinson Wright PLLC

(57) ABSTRACT

A steering column assembly includes an upper jacket. The assembly also includes a lower jacket operatively coupled to the upper jacket, the upper and lower jackets telescopingly movable relative to each other in an automated manner, the upper and lower jackets moveable in a rake direction over a first range of rake positions and over a second range of rake positions that is outside the first range of rake positions. The assembly further includes a clamp load controlling component in contact with the lower jacket to apply a first clamp load on a jacket interface between the upper and lower jackets while the lower jacket is within the first range of rake positions, the clamp load controlling component applying a lower clamp load on the jacket interface while the lower jacket is in the second range of rake positions.

19 Claims, 5 Drawing Sheets

(56) References Cited

U.S. PATENT DOCUMENTS

| | | | |
|---|---|---|---|
| 2018/0257693 A1* | 9/2018 | Schnitzer | B62D 1/184 |
| 2019/0210632 A1* | 7/2019 | Derocher | B62D 1/183 |
| 2020/0070868 A1* | 3/2020 | Patel | B62D 1/183 |
| 2020/0198684 A1* | 6/2020 | Murray | B62D 1/06 |

* cited by examiner

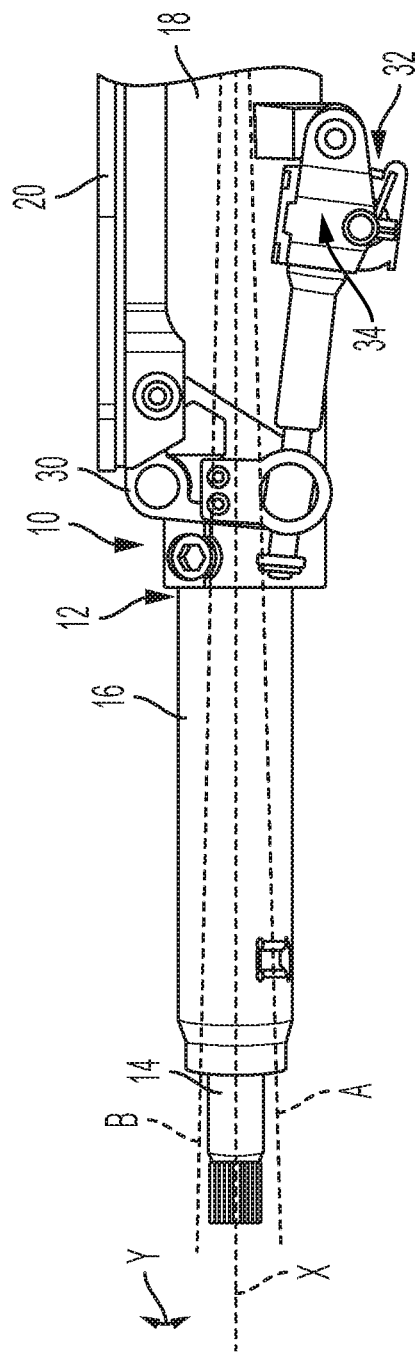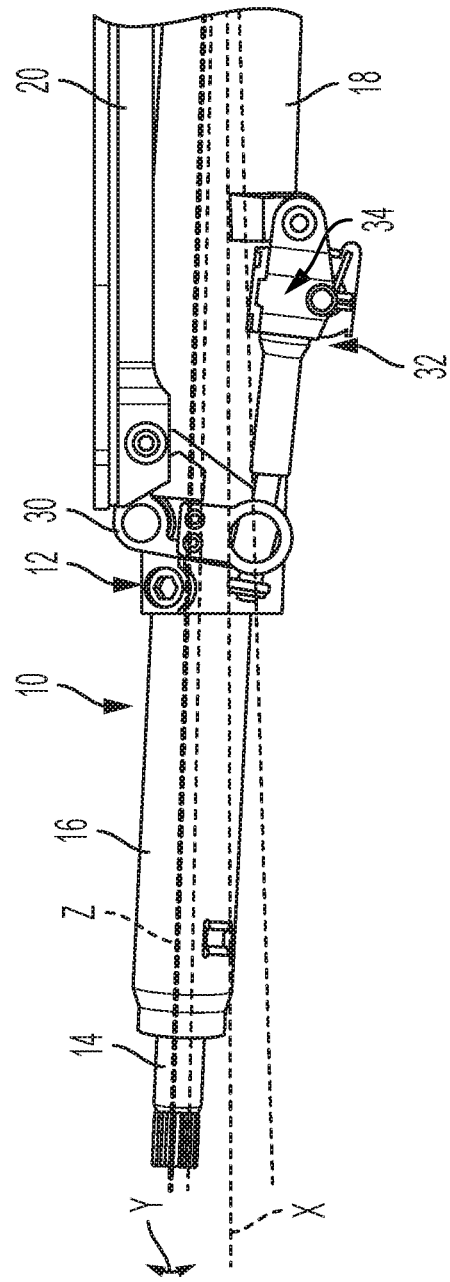

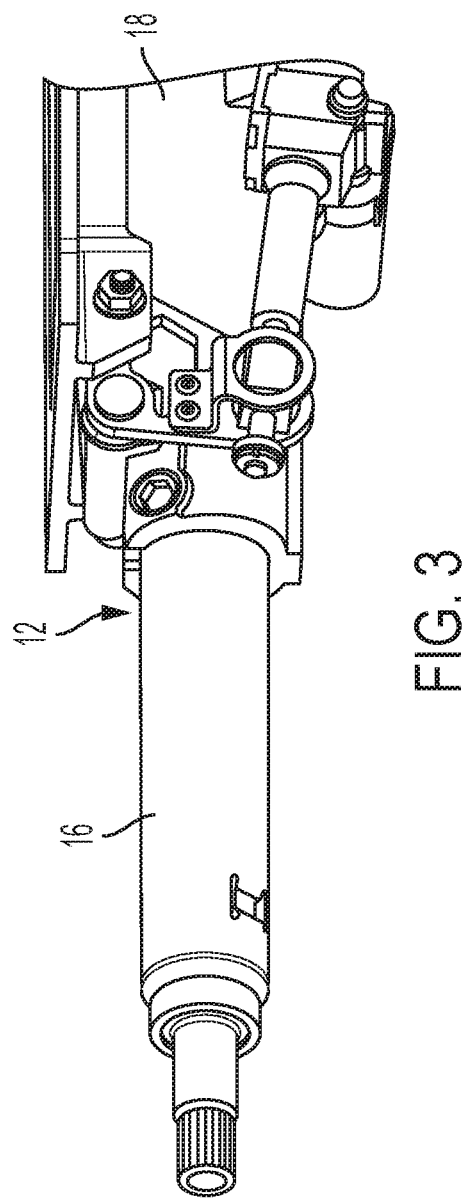
FIG. 3
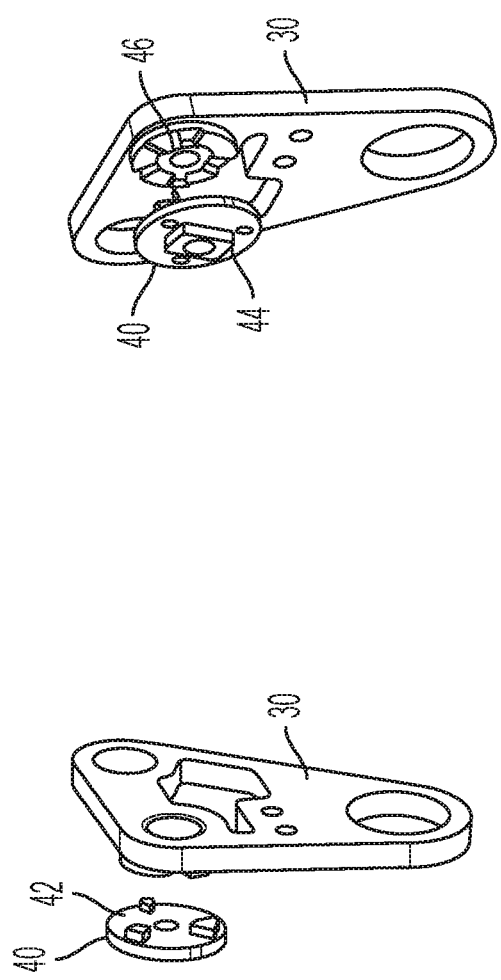
FIG. 5
FIG. 4

CLAMP LOAD ADJUSTMENT ASSEMBLY FOR STEERING COLUMN

BACKGROUND

The embodiments described herein relate to vehicle steering systems and, more particularly, to a clamp load adjustment assembly for a steering column assembly.

Typical steel tube upper jacket and cast lower jacket power columns are adjusted to a certain stroke load to meet a set of performance criteria, while also allowing the jacket to be driven telescopically by a power actuator (e.g., motor and gear box). Once the adjustment for stroke load is set, the column upper jacket is constantly loaded. During a telescoping motion that is driven by the actuator, the current control of linear speed is constant. In some designs, telescope adjustment or convenience speed may be in the range of 8-12 millimeters/second. When this type of jacket adjustment technique is used on longer telescope columns (i.e., stow columns), the speed at which the column stows cannot be increased and may be considered to be too slow.

SUMMARY

According to one aspect of the disclosure, a steering column assembly for an autonomous or semi-autonomous vehicle includes an upper jacket. The assembly also includes a lower jacket operatively coupled to the upper jacket, the upper and lower jackets telescopingly movable relative to each other in an automated, electrically powered manner, the upper and lower jackets moveable in a rake direction over a first range of rake positions and over a second range of rake positions that is outside the first range of rake positions. The assembly further includes a clamp load controlling component in contact with the lower jacket to apply a first clamp load on a jacket interface between the upper jacket and the lower jacket while the lower jacket is within the first range of rake positions, the clamp load controlling component applying a second clamp load on the jacket interface while the lower jacket is in the second range of rake positions, the second clamp load being less than the first clamp load.

According to another aspect of the disclosure, a steering column assembly includes an upper jacket. The assembly also includes a lower jacket operatively coupled to the upper jacket, the upper and lower jackets telescopingly moveable relative to each other. The assembly further includes a rake bracket operatively coupled to a rake actuator, the rake bracket pivotable between a first rotational position and a second rotational position. The assembly yet further includes a cam element located adjacent the lower jacket, the cam element applying a first clamp load on a jacket interface between the upper jacket and the lower jacket in the first rotational position of the rake bracket, the cam element applying a second clamp load on the jacket interface in the second rotational position of the rake bracket, the second clamp load being less than the first clamp load.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a side, elevational view of a steering column assembly in a first rake position;

FIG. 2 is a side, elevational view of the steering column assembly in a second rake position;

FIG. 3 is a perspective view of the steering column assembly;

FIG. 4 is a first perspective view of a cam assembly for the steering column assembly;

FIG. 5 is a second perspective view of the cam assembly;

DETAILED DESCRIPTION

Figure 6:
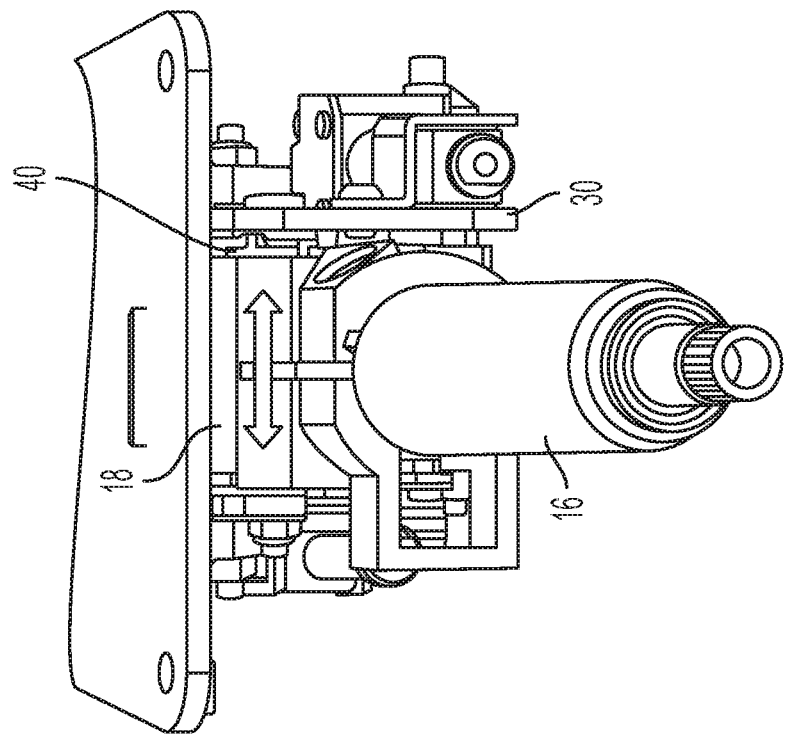
FIG. 6 is a perspective view of the steering column assembly in a first clamp load condition.

Referring now to the Figures, where the invention will be described with reference to specific embodiments, without limiting same, FIG. 1 illustrates a steering column assembly generally indicated with numeral 10. The steering column assembly 10 is for a vehicle and extends along a longitudinal axis X. The steering column assembly 10 is adjustable in both a rake direction Y generally transverse to the longitudinal axis X (tilt) and a telescopic direction generally parallel with the longitudinal axis X (i.e., adjustable along the longitudinal axis X). The steering column assembly 10 includes a column jacket assembly 12 and a steering shaft 14 extending along the longitudinal axis X. The column jacket assembly 12 includes multiple jackets (e.g., upper jacket 16 and lower jacket 18) in telescopic engagement with each other in some embodiments, such as the illustrated embodiment. A mounting bracket 20 facilitates attachment of the column-jacket assembly 12 to a vehicle.

FIG. 1 illustrates the steering column assembly 10 in a first position, which may be referred to as a nominal position for purposes of positional reference herein. Axis A and axis B are rake boundaries that define a first rake range of tilting that the column jacket assembly 12 is moveable within. The first rake range defines a range of motion that is used during manual driving of the vehicle. In particular, the first rake range defines tilt positions that a driver would typically position the column jacket assembly in for a convenient steering position. The steering column assembly includes a rake bracket 30 that is operatively coupled to a rake actuator 32. The rake actuator includes an electric motor and gear box within an actuator housing 34 to drive the rake bracket 30, which is operatively coupled to the lower jacket 18. Motion of the rake bracket 30 causes rake motion of the column jacket assembly 12 in direction Y.

The steering column assembly may also be operated in an autonomous or semi-autonomous driving mode. The term autonomous or semi-autonomous refers to vehicles or vehicle sub-systems that are configured to perform operations without continuous input from a driver (e.g., steering, accelerating, braking etc.) and may be equipped with Advanced Driver Assist Steering (ADAS) system(s) to allow the vehicle to be autonomously controlled using sensing, steering, and/or braking technology.

Referring now to FIG. 2, motion of the column jacket assembly 12 is shown to exceed the first rake range of motion that is defined by axis A and axis B. Rake positions outside (i.e., above or below) of the first rake range is referred to as a second rake range. An example of a rake position within the second rake range (i.e., outside of first rake range) is illustrated in FIG. 2, with the longitudinal axis of the column jacket assembly 12 being along axis Z. As described herein, movement of the column jacket assembly 12 to a position in the second rake range reduces a clamp load applied at a jacket interface defined as an interface between the upper jacket 16 and the lower jacket 18. The reduction in clamp load reduces the friction associated with telescoping motion of the upper jacket 16. This is beneficial during a telescoping motion to a stowed position of the column jacket assembly 12. A stowed position refers to a telescope position that retracts the column jacket assembly 12 (and possibly a steering wheel attached thereto) further away from a driver than a range of telescope positions that are employed during manual driving. In some embodiments, the jacket column assembly 12 is retracted completely within an instrument panel or close to such a position. Telescope motion to the stowed position is done during a transition to an autonomous or semi-autonomous driving mode. As a result of the reduced friction described above, the same motor that drives telescope motion in the manual driving mode may be employed to stow the column upper jacket 16 during a transition to the autonomous or semi-autonomous driving mode at a telescope speed that is greater than that which would occur if higher friction were present due to a greater clamp load.

Referring to FIGS. 3-5, a clamp load controlling assembly is illustrated. Included is a cam element 40 that is disposed between the lower jacket 18 and the rake bracket 30. The cam element 40 has a first side 42 with a surface profile that defines a first cam surface. The opposing second side 44 of the cam element 40 is in contact with the lower jacket 18. In some embodiments, the cam element 40 may be at least partially disposed within a void space of the lower jacket 18. The rake bracket 30 defines a second cam surface 46 that is in contact with the first side 42 of the cam element 40. Therefore, the cam surface of the cam element 40 and the cam surface of the rake bracket 30 interact with each other during relative movement between the cam element 40 and the rake bracket 30. In some embodiments, the cam surface of the cam element 40 includes a protrusion and the cam surface 46 of the rake bracket 30 includes a recess configured to at least partially receive the protrusion of the cam element 40. In other embodiments, the converse is the case, with the cam surface of the cam element 40 including a recess and the cam surface 46 of the rake bracket 30 including a protrusion. Although the cam surface 46 is illustrated and described above as a part of (e.g., integrally formed with) the rake bracket 30, it is to be appreciated that the cam surface 46 can be part of an additional component.

Figure 7:
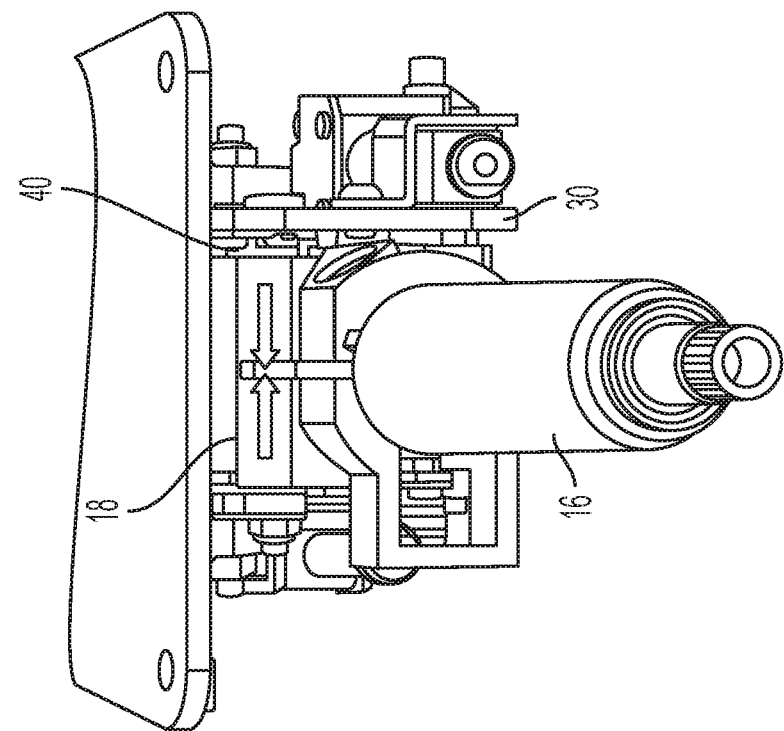
FIG. 7 is a perspective view of the steering column assembly in a second clamp load condition.

Regardless of the cam surface arrangement, the cam profiles are such that movement of the column jacket assembly 12 within the first rake range keeps the cam element 40 in a first lateral position, while movement of the column jacket assembly 12 outside of the first rake range to the second rake range shifts the cam element 40 to a second lateral position. Lateral movement of the cam element 40 is facilitated by the cam profile of the cam element and the rake bracket 30. The lateral movement between the first and second positions adjusts the clamp load applied at the jacket interface. In particular, the first lateral position of the cam element 40 applies a first clamp load at the jacket interface, as shown in FIG. 6, while the second lateral position of the cam element 40 applies a second clamp load at the jacket interface, as shown in FIG. 7. Movement of the cam element 40 away from the lower jacket 18 reduces the clamp load at the jacket interface, thereby reducing friction associated with telescope motion of the upper jacket. The reduced friction increases the speed at which the same telescope motor drives the telescoping movement. As described above, the column upper jacket 16 is moved to a stowed position at a faster rate with the reduced friction. Therefore, during a transition to an autonomous driving mode where the column upper jacket 16 is to be stowed, the rake position of the column jacket assembly 12 is first moved to the second rake range to allow the faster telescoping movement.

Figure 8D:
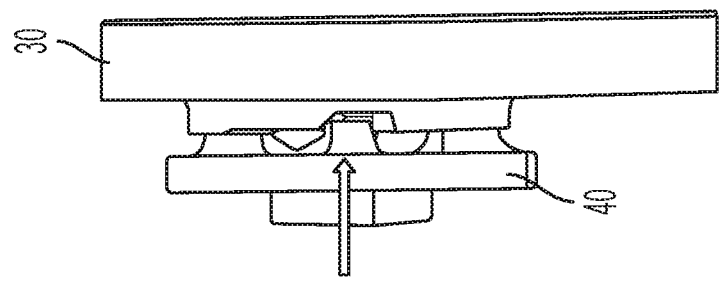
FIGS. 8A-8D is a side, elevational view of the cam assembly in various positions.
Figure 8C:
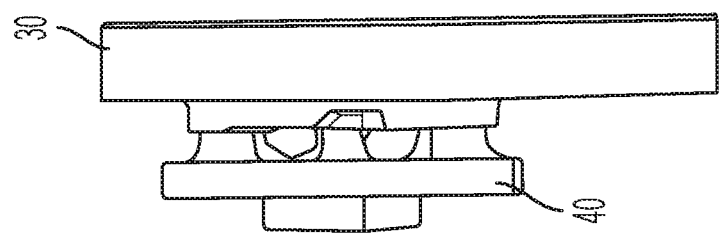
Figure 8B:
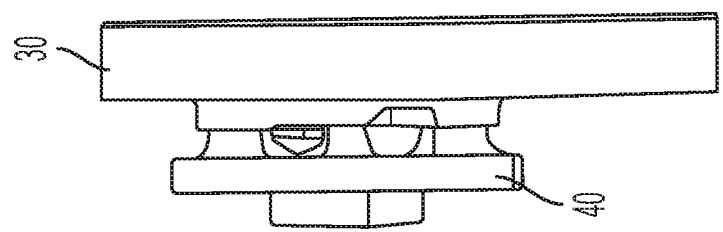
Figure 8A:
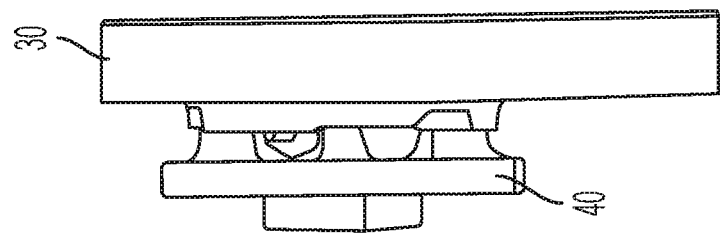

Referring now to FIGS. 8A-8D, a plurality of relative positions of the cam element 40 and the rake bracket 30 is illustrated. In particular, FIG. 8A illustrates the column jacket assembly 12 at a maximum rake down position defined by axis A (FIGS. 1 and 2) and 8B showing the column jacket assembly 12 at a maximum rake up position defined by axis B. In other words, rake movement of the column jacket assembly 12 over the entire first rake range maintains the cam element 40 at the first lateral position to maintain the first, higher clamp load at the jacket interface. FIG. 8C shows the column jacket assembly at a position just exceeding the maximum rake up position. In this position, the protrusion of the cam element 40 is entering the recess of the rake bracket 30. The lateral transition of the cam element 40 begins at this point to reduce the clamp load at the jacket interface. FIG. 8D shows the cam element 40 fully transitioned to the second lateral position away from the lower jacket 18. As described above, rake movement below the maximum rake down position may be the clamp load reducing movement in some embodiments.

Figure 9:
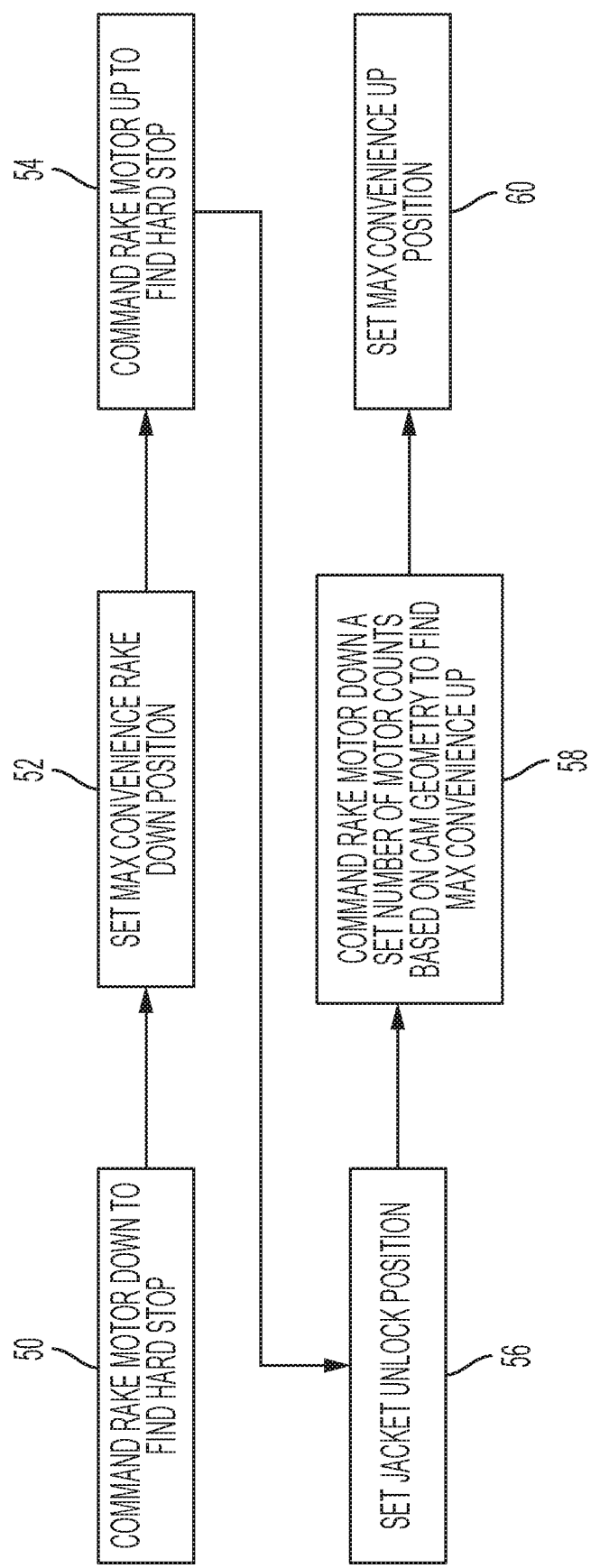
FIG. 9 is a flow diagram illustrating a method of operating the steering column assembly.

Referring now to FIG. 9, a flow diagram illustrates a method of operating the steering column assembly with the clamp load adjusting features described above. In particular, illustrated is a learning process of a column position module. This process is utilized to find the maximum rake up and rake down positions, as well as the jacket "unlock" position. The process is adaptable to the module learning an unlock position in a rake up and/or rake down position. At block 50, the motor of the rake actuator is commanded down to find a hard stop. At block 52, the max rake down position of the first rake range is set. At block 54, the motor of the rake actuator is commanded up to find a hard stop. At block 56, the jacket clamp load reducing position ("unlock") is set. At block 58, the motor of the rake actuator is commanded down to set a number of motor counts based on cam geometry to find a max rake up position of the first rake range. At block 60, the max rake up position of the first rake range is set.

The embodiments described herein provide dual actuator speeds due to the change in system friction. Therefore, a typical power actuator may continue to be employed instead of requiring a larger, more costly "stow actuator."

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly for an autonomous or semi-autonomous vehicle comprising:
   an upper jacket;
   a lower jacket operatively coupled to the upper jacket, the upper and lower jackets telescopingly movable relative to each other in an automated, electrically powered manner, the upper and lower jackets moveable in a rake direction over a first range of rake positions and over a second range of rake positions that is outside the first range of rake positions; and a clamp load controlling component in contact with the lower jacket to apply a first clamp load on a jacket interface between the upper jacket and the lower jacket while the lower jacket is within the first range of rake positions, the clamp load controlling component applying a second clamp load on the jacket interface while the lower jacket is in the second range of rake positions, the second clamp load being less than the first clamp load.

2. The steering column assembly of claim 1, further comprising a rake bracket operatively coupled to a rake actuator and to a mounting bracket, the rake bracket rotating during movement of the lower jacket in the rake direction, the clamp load controlling component disposed between the rake bracket and the lower jacket.

3. The steering column assembly of claim 2, wherein the clamp load controlling component is a cam element, the cam element having a first side with a first cam surface in contact with a second cam surface formed in the rake bracket, the cam element having a second side in contact with the lower jacket, movement of the lower jacket into the second range of rake positions moving the cam element away from the lower jacket to apply the second clamp load.

4. The steering column assembly of claim 3, wherein the cam element is operatively coupled to the rake bracket, the cam element and the rake bracket being relatively pivotable to each other.

5. The steering column assembly of claim 3, wherein the first cam surface includes a protrusion, the second cam surface comprising a recess, the protrusion disposed within the recess while the lower jacket is in the second range of rake positions.

6. The steering column assembly of claim 3, wherein the first cam surface includes a recess, the second cam surface comprising a protrusion, the protrusion disposed within the recess while the lower jacket is in the second range of rake positions.

7. The steering column assembly of claim 1, wherein the second range of rake positions comprises rake positions above the first range of rake positions.

8. The steering column assembly of claim 1, wherein the second range of rake positions comprises rake positions below the first range of rake positions.

9. The steering column assembly of claim 1, wherein the clamp load controlling component is disposed within a void space of the lower jacket.

10. The steering column assembly of claim 1, further comprising an electric motor driving the telescoping movement of the upper jacket relative to the lower jacket, the telescoping movement occurring at a first speed while the first clamp load is applied and occurring at a second speed while the second clamp load is applied, the second speed being greater than the first speed.

11. The steering column assembly of claim 10, wherein the telescoping movement occurs at the first speed during a manual driving mode of the steering column assembly and at the second speed during a transition to a stowed position of the upper jacket.

12. The steering column assembly of claim 11, further comprising an electric motor driving the telescoping movement of the upper jacket relative to the lower jacket, the telescoping movement occurring at a first speed while the first clamp load is applied and occurring at a second speed while the second clamp load is applied, the second speed being greater than the first speed.

13. The steering column assembly of claim 12, wherein the telescoping movement occurs at the first speed during a manual driving mode of the steering column assembly and at the second speed during a transition to a stowed position of the upper jacket.

14. A steering column assembly comprising:
an upper jacket;
a lower jacket operatively coupled to the upper jacket, the upper and lower jackets telescopingly moveable relative to each other;
a rake bracket operatively coupled to a rake actuator, the rake bracket pivotable between a first rotational position and a second rotational position; and
a cam element located adjacent the lower jacket, the cam element applying a first clamp load on a jacket interface between the upper jacket and the lower jacket in the first rotational position of the rake bracket, the cam element applying a second clamp load on the jacket interface in the second rotational position of the rake bracket, the second clamp load being less than the first clamp load.

15. The steering column assembly of claim 14, wherein the upper and lower jackets are moveable in a rake direction over a first range of rake positions and over a second range of rake positions that is outside the first range of rake positions, the cam element applying the first clamp load while the lower jacket is in the first range of rake positions, the cam element applying the second clamp load while the lower jacket is in the second range of rake positions.

16. The steering column assembly of claim 15, the cam element having a first side with a first cam surface in contact with a second cam surface formed in the rake bracket, the cam element having a second side in contact with the lower jacket, movement of the lower jacket into the second range of rake positions moving the cam element away from the lower jacket to apply the second clamp load.

17. The steering column assembly of claim 15, wherein the second range of rake positions comprises rake positions above the first range of rake positions.

18. The steering column assembly of claim 15, wherein the second range of rake positions comprises rake positions below the first range of rake positions.

19. The steering column assembly of claim 14, wherein the cam element is operatively coupled to the rake bracket.

* * * * *